(12) United States Patent
Ajitomi et al.

(10) Patent No.: US 10,044,812 B2
(45) Date of Patent: Aug. 7, 2018

(54) COMMUNICATION DEVICE, TERMINAL DEVICE, AND COMPUTER PROGRAM PRODUCT

(71) Applicant: Kabushiki Kaisha Toshiba, Minato-ku (JP)

(72) Inventors: Daisuke Ajitomi, Setagaya (JP); Keisuke Minami, Kawasaki (JP); Hiroshi Kawazoe, Kawasaki (JP); Hiroyuki Aizu, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 105 days.

(21) Appl. No.: 14/750,137

(22) Filed: Jun. 25, 2015

(65) Prior Publication Data

US 2016/0014213 A1 Jan. 14, 2016

(30) Foreign Application Priority Data

Jul. 9, 2014 (JP) .................................. 2014-141538

(51) Int. Cl.
*H04L 29/08* (2006.01)
*H04L 12/24* (2006.01)

(52) U.S. Cl.
CPC ............ *H04L 67/142* (2013.01); *H04L 67/02* (2013.01); *H04L 67/141* (2013.01); *H04L 41/12* (2013.01)

(58) Field of Classification Search
CPC ..... H04L 67/02; H04L 67/142; H04L 67/303; H04L 67/322; H04L 65/105; H04L 65/605; H04L 65/10; H04L 41/12
(Continued)

(56) References Cited

U.S. PATENT DOCUMENTS 7,590,741 B2 * 9/2009 Sumino .................. H04L 29/06
709/227
8,463,848 B2 * 6/2013 Kaplan ................. H04L 65/602
709/203
(Continued)

FOREIGN PATENT DOCUMENTS

JP 2009-253887 10/2009
JP 2014-199998 10/2014

OTHER PUBLICATIONS

Hideo Yamguchi et al. "Smart Remote Control with "WebSocket"", Nikkei Electronics, May 13, 2013, 10 pages (with Partial English Translation).
(Continued)

*Primary Examiner* — Ranodhi Serrao
*Assistant Examiner* — James Fiorillo
(74) *Attorney, Agent, or Firm* — Oblon, McClelland, Maier & Neustadt, L.L.P.

(57) ABSTRACT

According to an embodiment, a communication device performs communication with a terminal device via a network and includes first and second connection maintaining units and a switch instructing unit. The first connection maintaining unit maintains a connection established with the terminal device and mediates communication between the terminal device and another terminal device. The second connection maintaining unit maintains a communicable state of the terminal device with the communication device according to a method different from a method implemented by the first connection maintaining unit. When a predetermined switching condition is satisfied, the switch instructing unit instructs the terminal device to switch a method for maintaining a communicable state either from a first method, which is a method implemented by the first connection maintaining unit, to a second method, which is a
(Continued)

method implemented by the second connection maintaining unit, or from the second method to the first method.

14 Claims, 10 Drawing Sheets

(58) Field of Classification Search
USPC .................................. 709/203, 219, 227, 228
See application file for complete search history.

(56) References Cited

U.S. PATENT DOCUMENTS

| | | | | |
|---|---|---|---|---|
| 9,473,506 | B1* | 10/2016 | Hensley | H04L 63/0428 |
| 2004/0243712 | A1* | 12/2004 | Sakai | H04L 41/00 |
| | | | | 709/227 |
| 2009/0023450 | A1* | 1/2009 | George | H04L 12/66 |
| | | | | 455/442 |
| 2009/0219899 | A1* | 9/2009 | Dostal | H04W 48/10 |
| | | | | 370/338 |
| 2009/0259755 | A1* | 10/2009 | Boucachard | H04L 12/4633 |
| | | | | 709/227 |
| 2010/0023616 | A1* | 1/2010 | Harris | G06Q 30/04 |
| | | | | 709/224 |
| 2010/0115106 | A1* | 5/2010 | Moriwaki | H04L 29/12122 |
| | | | | 709/227 |
| 2010/0241754 | A1* | 9/2010 | Niiya | H04L 65/105 |
| | | | | 709/228 |
| 2012/0072548 | A1* | 3/2012 | Kim | H04L 61/1535 |
| | | | | 709/219 |
| 2012/0179829 | A1* | 7/2012 | George | H04L 61/2564 |
| | | | | 709/227 |
| 2013/0007484 | A1* | 1/2013 | Gobriel | G06F 1/3209 |
| | | | | 713/320 |
| 2013/0036229 | A1* | 2/2013 | Choi | H04L 41/0853 |
| | | | | 709/227 |
| 2013/0060927 | A1* | 3/2013 | Park | H04L 67/322 |
| | | | | 709/223 |
| 2013/0212228 | A1* | 8/2013 | Butler | H04L 65/605 |
| | | | | 709/219 |
| 2013/0283364 | A1* | 10/2013 | Chang | H04L 49/70 |
| | | | | 726/12 |
| 2014/0108668 | A1* | 4/2014 | Zhang | H04W 76/10 |
| | | | | 709/228 |
| 2014/0126715 | A1* | 5/2014 | Lum | H04M 3/5133 |
| | | | | 379/265.09 |
| 2014/0156725 | A1* | 6/2014 | Mandyam | H04L 67/02 |
| | | | | 709/203 |
| 2014/0297878 | A1 | 10/2014 | Minami et al. | |
| 2014/0304207 | A1* | 10/2014 | Chandrayana | H04L 29/08072 |
| | | | | 706/48 |
| 2014/0330977 | A1* | 11/2014 | van Bemmel | H04L 69/22 |
| | | | | 709/226 |
| 2014/0337536 | A1* | 11/2014 | Tang | H04W 76/38 |
| | | | | 709/227 |
| 2014/0376405 | A1* | 12/2014 | Erickson | H04W 76/10 |
| | | | | 370/254 |
| 2014/0376530 | A1* | 12/2014 | Erickson | H04L 45/741 |
| | | | | 370/338 |
| 2015/0222517 | A1* | 8/2015 | McLaughlin | H04W 4/70 |
| | | | | 713/156 |
| 2015/0295982 | A1* | 10/2015 | Kafle | H04L 65/1083 |
| | | | | 709/219 |
| 2016/0080219 | A1* | 3/2016 | Ishizaka | H04Q 9/00 |
| | | | | 709/224 |
| 2016/0286279 | A1* | 9/2016 | Yang | H04N 21/4126 |
| 2017/0026616 | A1* | 1/2017 | Nur | H04L 65/403 |

OTHER PUBLICATIONS

X. Chen et al. "WebSocket Protocol as a Transport for Traversal Using Relays Around NAT (TURN)", Behavior Engineering for Hindrance Avoidance, Sep. 12, 2013, 10 pages.

* cited by examiner

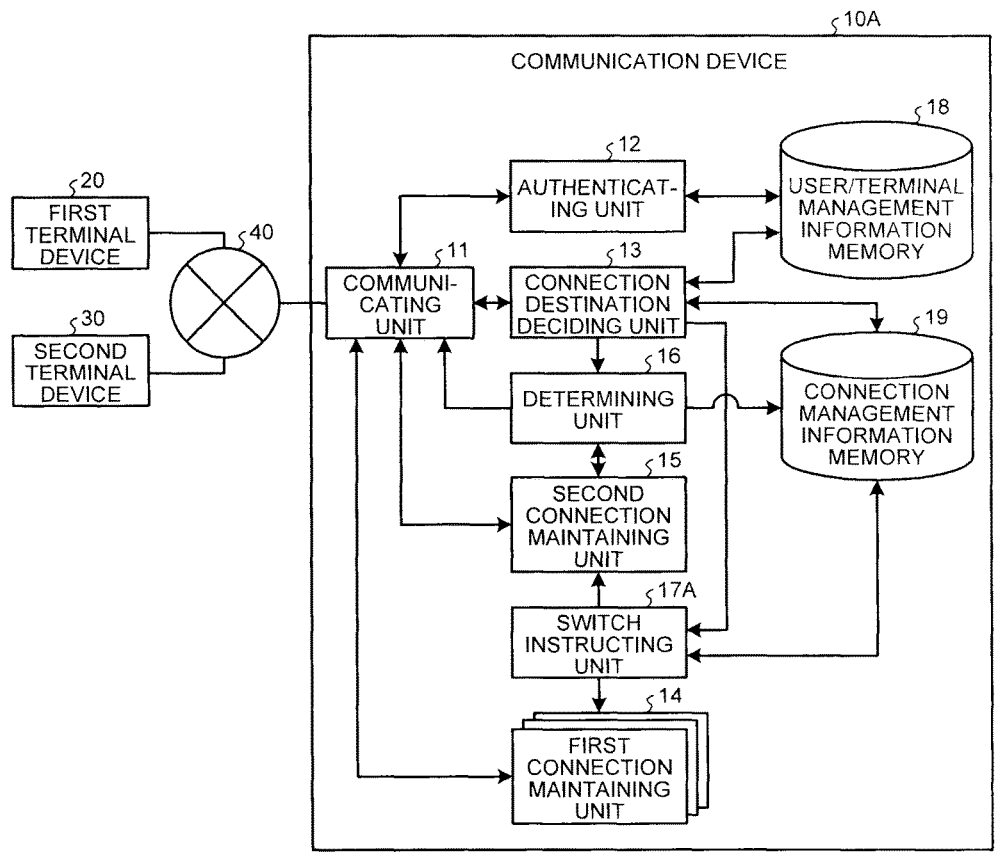

FIG.3

TERMINAL MANAGEMENT INFORMATION

| TERMINAL DEVICE IDENTIFICATION INFORMATION device_id | USER IDENTIFICATION INFORMATION |
|---|---|
| ... | ... |
| ... | ... |
| ⋮ | ⋮ |

FIG.4

COMBINATION MANAGEMENT INFORMATION

| TERMINAL DEVICE IDENTIFICATION INFORMATION device_id | TERMINAL DEVICE IDENTIFICATION INFORMATION device_id |
|---|---|
| ... | ... |
| ... | ... |
| ⋮ | ⋮ |

FIG.5

CONNECTION MANAGEMENT INFORMATION

| TERMINAL DEVICE IDENTIFICATION INFORMATION device_id | CONNECTION IDENTIFICATION INFORMATION conn_id | TCP SERVER DEVICE IDENTIFICATION INFORMATION tcp_server_id | UDP SERVER DEVICE IDENTIFICATION INFORMATION udp_server_id | COMMUNICATION MAINTENANCE METHOD tcp_or_udp |
|---|---|---|---|---|
| digital_tv_0001 | conn_0001 | tcp.server01 | 10.100.200.1:12345 | udp |
| digital_tv_0002 | conn_0001 | tcp.server01 | 10.100.200.2:12345 | udp |
| digital_tv_0003 | conn_0002 | tcp.server02 | 10.100.200.1:12345 | tcp |
| digital_tv_0004 | conn_0003 | tcp.server02 | 10.100.200.2:12345 | udp |
| digital_tv_0005 | conn_0002 | tcp.server01 | 10.100.200.2:12345 | tcp |
| digital_tv_0006 | conn_0003 | tcp.server02 | 10.100.200.1:12345 | unknown |

COMMUNICATION DEVICE, TERMINAL DEVICE, AND COMPUTER PROGRAM PRODUCT

CROSS-REFERENCE TO RELATED APPLICATIONS

This application is based upon and claims the benefit priority from Japanese Patent Application No. 2014-141538, filed on Jul. 9, 2014; the entire contents of which are incorporated herein by reference.

FIELD

Embodiments described herein relate generally to a communication device, a terminal device, and a computer program product.

BACKGROUND

A communication protocol called WebSocket is known as a web-standard communication protocol that enables maintaining any established connection and achieving reduction in the delay during a connection establishment operation, and therefore enables performing low-delay communication. A WebSocket server has a limitation on the number of connections that can be independently retained. Hence, it is common practice to configure a system with a plurality of servers. In that regard, a technology is known in which two terminal devices capable of performing two-way communication establish a connection with the same WebSocket server so that the two-way communication concludes in a single server and the delay is held down to only a small amount.

In order for a WebSocket server to stay connected with the terminal devices, connection information and a transmission-reception buffer needs to be secured in the WebSocket server. For that reason, an increase in the number of connections to be maintained by a WebSocket server leads to an increase in the server operation cost. On the other hand, there is a method available in which the terminal devices periodically access a server (periodically perform polling) to maintain a communicable state. However, in this method, it is more likely to have a delay in communication as compared to the connection maintenance method implemented in a WebSocket server. Therefore, there is a demand to achieve low-delay communication while holding down the number of connections to be maintained by a WebSocket server.

BRIEF DESCRIPTION OF THE DRAWINGS

FIG. 1 is a configuration diagram of a communication device according to a first embodiment;

FIG. 2 is a conceptual diagram illustrating an example of user management information;

FIG. 3 is a conceptual diagram illustrating an example of terminal management information;

FIG. 4 is a conceptual diagram illustrating an example of combination management information;

FIG. 5 is a conceptual diagram illustrating an example of connection management information;

DETAILED DESCRIPTION

Figure 6:
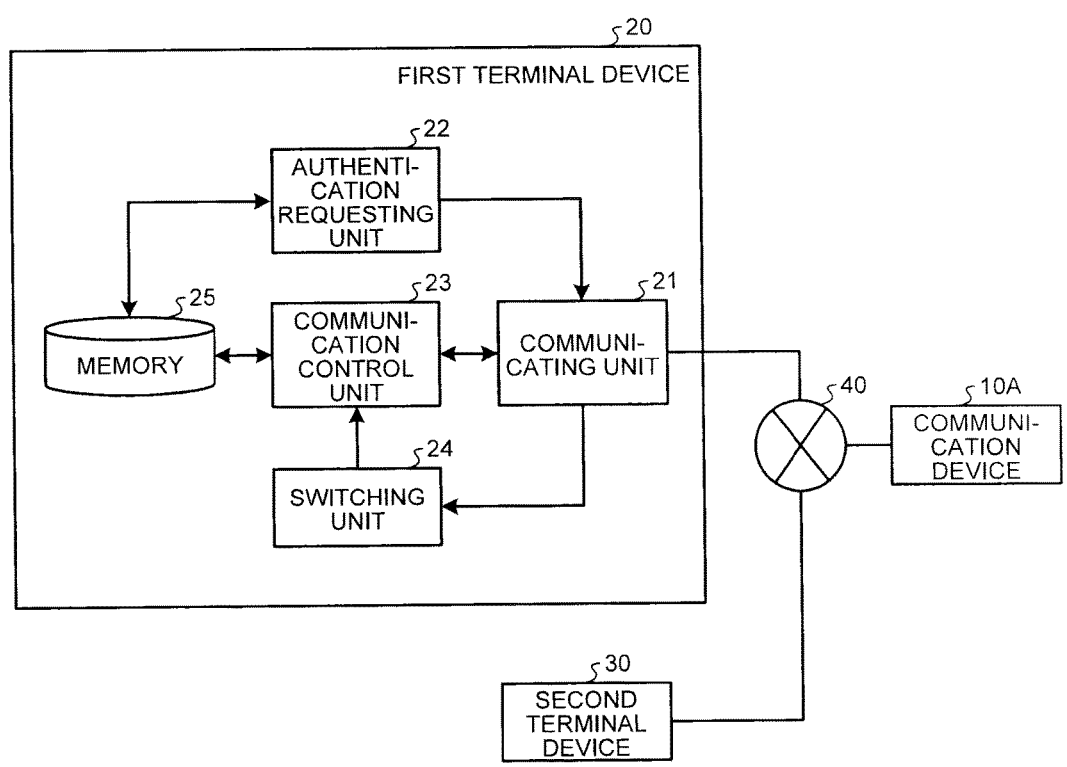
FIG. 6 is a configuration diagram of a first terminal device.

According to an embodiment, a communication device performs communication with a terminal device via a network and includes a first connection maintaining unit, a second connection maintaining unit, and a switch instructing unit. The first connection maintaining unit maintains a connection established with the terminal device and mediates communication between the terminal device and another terminal device. The second connection maintaining unit maintains a communicable state of the terminal device with the communication device according to a method different from a method implemented by the first connection maintaining unit. When a predetermined switching condition is satisfied, the switch instructing unit instructs the terminal device to switch a method for maintaining a communicable state either from a first method, which is a method implemented by the first connection maintaining unit, to a second method, which is a method implemented by the second connection maintaining unit, or from the second method to the first method.

Various embodiments will be described below under the assumption that a terminal to be operated (such as a digital television set) is remote-controlled using an operating terminal (such as a smartphone). Herein, the terminal to be operated is not limited to a digital television set; and alternatively can be a large household electrical appliance, a household equipment (such as a lighting, a smart meter, an energy measuring device, a distribution switchboard, a water heater, a door phone, an electronic lock, or a security camera), or a sensor (such as a motion detector or a window sensor). Moreover, the operating terminal is not limited to a smartphone; and alternatively can be a tablet terminal or a personal computer (PC).

A communication device according to the embodiments establishes a connection with an operating terminal as well as with a terminal to be operated, and transfers control commands sent by the operating terminal to the terminal to be operated. With that, remote controlling can be achieved in real time and with only a small amount of delay. As a specific sequence of operations, firstly, the communication device according to the embodiments establishes a connection with a terminal to be operated (for example, a digital television set) in response to a connection establishment request received from the terminal to be operated, and maintains the established connection. Similarly, the communication device establishes a connection with an operating terminal (for example, a smartphone) in response to a connection establishment request received from the operating terminal. Then, the communication device receives a control command from the operating terminal through the connection established with the operating terminal, and transfers the control command to the terminal to be operated through the connection established with the terminal to be operated.

In this way, by maintaining the connection established particularly with the terminal to be operated, the communication device according to the operations enables achieving remote controlling in real time and with only a small amount of delay. However, if there is an increase in the number of connections to be maintained, there is a risk of an increase in the server operation cost. In that regard, the communication device according to the embodiments separately includes a constituent element (such as a UDP hole punching server) that enables the terminal to be operated to maintain a communicable state with the communication device without having to maintain the connection. Moreover, according to a predetermined switching condition, the method by which the terminal to be operated maintains a communicable state with the communication device (hereinafter, called a communication maintenance method) is switched in a dynamic manner. As a result, while holding down an increase in the number of connections to be maintained, it becomes possible to achieve low-delay communication.

Explained below in detail and with reference to the accompanying drawings are specific embodiments in each of which a condition for instructing the terminal to be operated to switch the access destination (i.e., a switching condition) is different. In the embodiments explained below, of the terminal devices with which the communication device performs communication, particularly the terminal to be operated such as a digital television set is written as a "first terminal device"; while the operating terminal such as a smartphone is written as a "second terminal device". Moreover, when the terminal to be operated and the operating terminal are not distinguished from each other, simply the term "terminal devices" is used. Furthermore, in the following embodiments, for the purpose of illustration, the explanation is given about only a single set of a terminal to be operated (a first terminal device) and an operating terminal (a second terminal device). However, in practice, the communication device according to the embodiments performs identical operations with respect to many more sets of terminals to be operated and operating terminals.

First Embodiment

FIG. 1 is a configuration diagram of a communication device 10A according to a first embodiment. The communication device 10A illustrated in FIG. 1 communicates with a first terminal device 20 and a second terminal device 30 via a network 40. Typically, the communication device 10A is implemented as a server device having the hardware configuration of a commonly-used computer system (including a central processing unit (CPU), a main memory, an auxiliary memory, and a communication interface). However, alternatively, the communication device 10A can be implemented as a digital device such as a personal computer (PC), a digital television set, a hard disk recorder, a slate PC, or a smartphone. Moreover, it is assumed that the communication device 10A can have different variations in the configuration (variations in the number or capacity of the CPU, the main memory, or the auxiliary memory, or the connection interface standard). Still alternatively, the communication device 10A can be implemented as a virtual machine running in a cloud system.

In the first embodiment, the communication device 10A is assumed to be a server device installed in the network 40 such as the Internet.

The first terminal device 20 and the second terminal device 30 are terminal devices that perform two-way communication via the communication device 10A. Each of the terminal devices 20 and 30 is a digital device such as a PC, a set-top box (STB), a digital television set, a hard disk recorder, a tablet terminal, or a smartphone. Alternatively, as long as the terminal devices 20 and 30 have the function of communicating with the communication device 10A via the network 40, any type of devices can be used. For example, the terminal devices 20 and 30 can be relay devices such as broadband routers or can be devices such as large household electrical appliances or sensors that have a low capacity for data processing.

In the first embodiment, as described above, it is assumed that a digital television set is used as the first terminal device 20 and a smartphone is used as the second terminal device 30, and that the digital television set is remote-controlled from the smartphone in real time and with only a small amount of delay.

The network 40 can be of an arbitrary physical medium and can have an arbitrary configuration, as long as the communication device 10A can perform two-way communication with the terminal devices 20 and 30. In the most common network configuration in the first embodiment, the second terminal device 30 accesses the communication device 10A via the mobile Internet, while the first terminal device 20 is connected to the Internet via a broadband router from an in-house local area network (LAN). However, this network configuration can have different variations, and is not limited to the common specific example given above.

Given below is the specific explanation of the functional constituent elements of the communication device 10A. As illustrated in FIG. 1, the communication device 10A includes a communicating unit 11, an authenticating unit 12, a connection destination deciding unit 13, a first connection maintaining unit 14, a second connection maintaining unit 15, a determining unit 16, a switch instructing unit 17A, a user/terminal management information memory 18, and a connection management information memory 19. Herein, the user/terminal management information memory 18 and the connection management information memory 19 can be implemented using different memory devices or using the same memory device.

The communicating unit 11 is functional block that communicates with the terminal devices 20 and 30 via the network 40. More particularly, for example, the communicating unit 11 is a functional component configured with a network interface card (NIC) including a TCP/IP communications stack (TCP/IP stands for transmission control protocol/Internet protocol). Herein, the TCP/IP communications stack can be installed as hardware on the NIC, or can be installed as software running in an operating system (OS), or can be installed as software in the form of a driver. Meanwhile, the transport layer is not limited to the TCP. Alternatively, for example, the user datagram protocol (UDP) can also be used. Moreover, the physical/MAC layer is not limited to Ethernet (registered trademark), but can be a wireless LAN such as such as Wi-Fi or can be InfiniBand.

The authenticating unit 12 performs a user authentication and a terminal authentication in response to an authentication request received from the terminal devices 20 and 30. An authentication request received from the terminal devices 20 and 30 includes identification information and a password unique to the user using the terminal devices 20 and 30 and includes terminal device identification information unique to the terminal devices 20 and 30. Herein, the identification information and the password are, for example, input by the user of the terminal devices 20 and 30.

The terminal device identification information is stored in advance in the terminal devices 20 and 30.

During the user authentication, the combination of the user identification information and the password included in an authentication request from the terminal devices 20 and 30 is collated with user management information stored in the user/terminal management information memory 18. As illustrated in FIG. 2, in the user/terminal management information memory 18, the user management information is stored in the form of, for example, a table in which pieces of user identification information and passwords are written in a corresponding manner. If the combination of a piece of user identification information and a password specified an an authentication request that is received from the terminal devices 20 and 30 is included in the user management information, the authenticating unit 12 determines that the authentication is successful. However, if the combination is not included, then the authenticating unit 12 determines that the authentication is not successful.

During the terminal authentication, the combination of the user identification information and the terminal device identification information included in an authentication request from the terminal devices 20 and 30 is collated with terminal management information stored in the user/terminal management information memory 18. As illustrated in FIG. 3, in the user/terminal management information memory 18, the terminal management information is stored in the form of, for example, a table in which pieces of terminal device identification information and pieces of user identification information are written in a corresponding manner. If the combination of the terminal device identification information and the user identification information specified in an authentication request that is received from the terminal devices 20 and 30 is included in the terminal management information, the authenticating unit 12 determines that the authentication is successful. However, if the combination is not included, then the authenticating unit 12 determines that the authentication is not successful.

Meanwhile, if the terminal devices 20 and 30 are not equipped with the function of receiving a user input of the user identification information and the password, then the authenticating unit 12 may skip the user authentication and perform only the terminal authentication. In that case, the user identification information is stored in advance in the terminal devices 20 and 30; and an authentication request from the terminal devices 20 and 30 includes the user identification information and the terminal device identification information. Then, the authenticating unit 12 collates the combination of the user identification information and the terminal device identification information included in an authentication request with the terminal management information stored in the user/terminal management information memory 18.

The authentication result (successful/unsuccessful authentication) of the authenticating unit 12 is notified to the terminal devices 20 and 30 that had issued the authentication request. The notification about successful authentication includes session identification information (described later) indicating that the terminal devices 20 and 30 are already authenticated. Upon receiving an authentication result indicating successful authentication from the communication device 10A, the terminal devices 20 and 30 issue a connection establishment request to the communication device 10A. The connection establishment request includes the session identification information and the terminal device identification information.

In response to a connection establishment request received from the terminal devices 20 and 30, the connection destination deciding unit 13 decides on the connection destination (the first connection maintaining unit 14) with which the terminal devices 20 and 30 should establish a connection. In the first embodiment, as described later, the first connection maintaining unit 14 is configured with a plurality of communication servers. Thus, the connection destination deciding unit 13 decides on the communication server, from among a plurality of communication servers constituting the first connection maintaining unit 14, with which the terminal devices 20 and 30 should establish a connection. In response to a connection establishment request issued by the first terminal device 20 serving as the terminal to be operated, the connection destination deciding unit 13 decides on the connection destination in a random manner. On the other hand, in response to a connection establishment request issued by the second terminal device 30 that corresponds to the first terminal device 20 for which the connection destination has already been decided, the connection destination deciding unit 13 decides on the same communication server, which is the connection destination for the first terminal device 20, as the connection destination for the second terminal device 30 too.

The correspondence relationship between the first terminal device 20 and the second terminal device 30 is stored in advance as combination management information in the user/terminal management information memory 18. For example, as illustrated in FIG. 4, the pieces of terminal device identification information of the first terminal device 20 and the second terminal device 30, which have a correspondence relationship, are written in a corresponding manner in a table stored in the user/terminal management information memory 18. The connection destination deciding unit 13 refers to the combination management information stored in the user/terminal management information memory 18, and identifies the correspondence relationship between the first terminal device 20 and the second terminal device 30. Moreover, the already-decided connection destination for the first terminal device 20 can be identified by referring to connection management information (described later) that is stored in the connection management information memory 19. If the second terminal device 30 corresponds to the first terminal device for which the connection destination is already decided, then the connection destination deciding unit 13 decides on the same communication server, which is the connection destination for the first terminal device 20 thus identified as described above, as the connection destination for the second terminal device 30.

Upon deciding on the connection destinations for the terminal devices 20 and 30 that have issued a connection establishment request, the connection destination deciding unit 13 registers the connection management information about the terminal devices 20 and 30 in the connection management information memory 19. For example, as illustrated in FIG. 5, in the connection management information memory 19, the connection management information is stored as a table in which the following information is written in a corresponding manner: the terminal device identification information of the terminal devices 20 and 30; the connection identification information; server identification information (TCP server device identification information) of the first connection maintaining unit 14; server identification information (UDP server device identification information) of the second connection maintaining unit 15; and the communication maintenance method. In FIG. 5 is illustrated a configuration in which the terminal device identification information serves as the primary key. However, alternatively, without using the terminal device identification information, the session identification information can be used as the key. The session identification information is obtained as a result of performing the user authentication which can be performed before a connection establishment request is issued.

The connection identification information enables identification of the connections of the terminal devices 20 and 30 with the communication device 10A. The connection destination deciding unit 13 issues the connection identification information in response to a connection establishment request issued by the terminal devices 20 and 30. The TCP server device identification information represents identification information of the communication server of the first connection maintaining unit 14 that is decided as the connection destination for the terminal devices 20 and 30 by the connection destination deciding unit 13. The UDP server device identification information represents identification information of the communication server constituting the second connection maintaining unit 15. Meanwhile, the connection management information regarding the second terminal device 30 may not contain the UDP server device identification information.

The communication maintenance method represents information indicating the existing communication maintenance method implemented in the first terminal device 20. In the first embodiment, the communication maintenance method of the first terminal device 20 can be a method for maintaining the connection using the first connection maintaining unit 14 (hereinafter, called a first method) or can be a method for maintaining a communicable state by periodically accessing the second connection maintaining unit 15 (hereinafter, called a second method). In the example illustrated in FIG. 5, when the existing communication maintenance method of the first terminal device 20 is decided to be the first method, "tcp" is stored as the communication maintenance method. However, when the existing communication maintenance method of the first terminal device 20 is decided to be the second method, "udp" is stored as the communication maintenance method. Moreover, when the communication maintenance method of the first terminal device 20 is not decided, "unknown" is stored as the communication maintenance method.

Meanwhile, in FIG. 5, the connection management information of only the first terminal device 20 is illustrated. However, when both of the connection management information of the first terminal device 20 and the connection management information of the second terminal device 30 are present, information indicating the terminal type (whether it is the first terminal device 20 (the terminal to be operated) or the second terminal device 30 (the operating terminal)) for the purpose of distinguishing between the terminals can be included in the connection management information.

As described above, in the case of deciding on the connection destination in response to a connection establishment request issued by the second terminal device 30 that corresponds to the first terminal device 20 for which the connection destination is already decided, the connection destination deciding unit 13 refers to the connection management information and, as the connection destination of the second terminal device 30 that issued the connection establishment request, decides on the communication server that is identified by the TCP server device identification information associated to the terminal device identification information of the first terminal device 20 corresponding to the concerned second terminal device 30.

Moreover, once the connection destination is decided for the terminal devices 20 and 30 that issued the connection establishment request, the connection destination deciding unit 13 sends a notification about connection destination information to the terminal devices 20 and 30. The connection destination information contains the TCP server device identification information of the communication server of the first connection maintaining unit 14 that is decided as the connection destination. Moreover, in response to the connection establishment request issued by the first terminal device 20, the notification includes not only the connection identification information but also the UDP server device identification information of the communication server constituting the second connection maintaining unit 15.

The first connection maintaining unit 14 is a server that maintains the connection with the terminal devices 20 and 30 (according to the first method) and mediates the communication between the terminal devices 20 and 30. In reality, the first connection maintaining unit 14 represents a plurality of communication servers to which the terminal devices 20 and 30 are actually connected and which performs two-way communication. These communication servers are implemented in the form of server software running in a virtual machine or a physical machine; and the connection information of the second terminal device 30 serving as the operating terminal and the connection information of the first terminal device 20 serving as the terminal to be operated is cached in a memory space that can be referred to by server software processors. Herein, it is assumed that the first connection maintaining unit 14 maintains the communication connection of the TCP or the TLS/SSL protocol (TLS/SSL stands for transport layer security/secure sockets layer), and the higher-level communication protocols are no object. In the first embodiment, the first connection maintaining unit 14 is assumed to be in the form of WebSocket server software.

The second connection maintaining unit 15 is a server device that, according to a different method (the second method) from the method implemented in the first connection maintaining unit 14, enables the first terminal device 20 to maintain a communicable state with the communication device 10A. More particularly, the first connection maintaining unit 14 makes use of the TCP or the TLS/SSL protocol having the concept of connection. In contrast, the second connection maintaining unit 15 is assumed to make use of the UDP or DTLS protocol (DTLS stands for datagram transport layer security). In the first embodiment, the second connection maintaining unit 15 is assumed to be a UDP hole punching server that periodically receives UDP packets and DTLS packets (UDP heartbeat) and, using a routing table in the generated/maintained communication path, maintains a state enabling a UDP access from the communication device 10A to the first terminal device 20.

The determining unit 16 determines whether or not the communicable state attained according to the second method, which is implemented by the second connection maintaining unit 15, can be maintained with respect to the first terminal device 20 that issued a connection establishment request. The determination result (maintainable/not maintainable) of the determining unit 16 is sent to the first terminal device 20 that issued a connection establishment request. A specific example of the determination performed by the determining unit 16 is explained later in detail.

Moreover, according to the determination result with respect to the first terminal device 20, the determining unit 16 updates the connection management information regarding the first terminal device 20 that issued the connection establishment request. That is, if it is determined that the first terminal device 20 can maintain a communicable state according to the second method, then the determining unit 16 sets "udp" as the communication maintenance method in the connection management information regarding the first terminal device 20. On the other hand, if it is determined that the first terminal device 20 cannot maintain a communicable state according to the second method, then the determining unit 16 sets "tcp" as the communication maintenance method in the connection management information regarding the first terminal device 20.

Meanwhile, in the configuration diagram illustrated in FIG. 1, the determining unit 16 is illustrated in a different block from the second connection maintaining unit 15. However, alternatively, the determining unit 16 can also be implemented as one of the functions of the second connection maintaining unit 15.

The switch instructing unit 17A instructs, when a predetermined switching condition is satisfied, the first terminal device 20, which is determined to be able to maintain a communicable state according to the second method, to switch the communication maintenance method from the first method to the second method or from the second method to the first method.

In the first embodiment, establishing a connection and terminating the connection of the second terminal device 30 with respect to the communication device 10A are set as the switching conditions. That is, when a connection establishment request is issued by the second terminal device 30 that has a correspondence relationship with the first terminal device 20 which is maintaining a communicable state according to the second method, the switch instructing unit 17A instructs the first terminal device 20 to switch the communication maintenance method from the second method to the first method. This instruction is sent to the first terminal device 20 as, for example, a message from the second connection maintaining unit 15.

Thereafter, when termination of the connection between the second terminal device 30 and the communication device 10A is detected, the switch instructing unit 17A instructs the first terminal device 20, which is maintaining a communicable state according to the first method (i.e., maintaining the connection with the communication device 10A), to switch the communication maintenance method from the first method to the second method. This instruction is sent to the first terminal device 20 as, for example, a message from the first connection maintaining unit 14.

Given below is a specific explanation of the functional constituent elements of the first terminal device 20. FIG. 6 is a configuration diagram of the first terminal device 20. As illustrated in FIG. 6, the first terminal device 20 includes a communicating unit 21, an authentication requesting unit 22, a communication control unit 23, a switching unit 24, and a memory 25.

The communicating unit 21 represents a functional block that communicates with the communication device 10A, and can have an identical configuration to the communicating unit 11 of the communication device 10A.

The authentication requesting unit 22 obtains, in response to a user operation of the first terminal device 20, for example, the user identification information and the password input by the user and obtains the terminal device identification information stored in the memory 25; and issues an authentication request to the communication device 10A.

The communication control unit 23 controls the communication with the communication device 10A. In the case of maintaining a communicable state with the communication device 10A according to the first method, the communication control unit 23 issues a connection establishment request by specifying the communication server of the first connection maintaining unit 14 that is decided as the connection destination by the communication device 10A, and establishes a connection. This connection is then maintained by the first connection maintaining unit 14. Moreover, in the case of maintaining a communicable state with the communication device 10A according to the second method, the communication control unit 23 periodically accesses (performs polling of) the second connection maintaining unit 15 of the communication device 10A.

The switching unit 24 switches the communication maintenance method from the first method to the second method or from the second method to the first method in response to a switching instruction issued by the switch instructing unit 17A of the communication device 10A.

Figure 7:
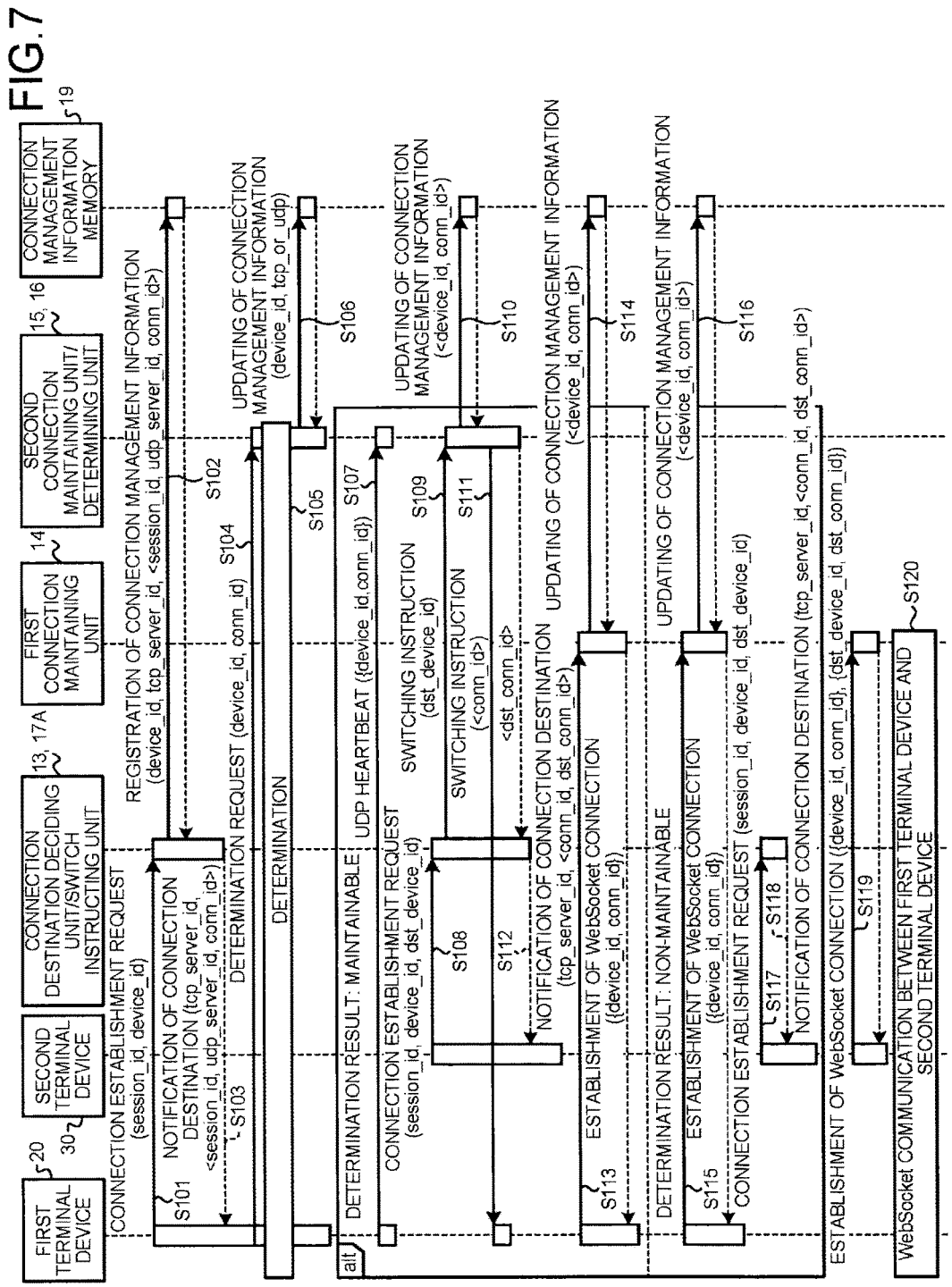
FIG. 7 is a sequence diagram illustrating the operations performed by a communication device according to the first embodiment.

Given below is the explanation of the operations performed by the communication device 10A according to the first embodiment. FIG. 7 is a sequence diagram illustrating the operations performed by the communication device 10A according to the first embodiment. In the parameter notation given in FIG. 7, "{ }" represents the selection of either one of the elements written therein. Moreover, "< >" represents that the element written therein is optional. When an entire parameter is enclosed in "< >", it indicates that the message itself is optional. Firstly, the following explanation is given about the parameters used in FIG. 7.

A parameter "session_id" represents the session identification information which, as described above, indicates that the first terminal device 20, which is the terminal to be operated (such as a digital television set), and the second terminal device 30, which is the operating terminal (such as (an application) of a smartphone), are already authenticated. The session identification information is issued when, for example, the result of the authentication indicates success. Alternatively, the session identification information can be embedded in advance as confidential information in the terminal devices 20 and 30 that are legitimate (having the connection rights with respect to the communication device 10A). Moreover, a mechanism for periodically updating the session identification information, which is embedded as confidential information in the terminal devices 20 and 30, can be disposed in between the terminal devices 20 and 30 and the communication device 10A.

A parameter "device_id" represents the terminal device identification information ("dst_device_id" represents the terminal device identification information of the terminal device at the other end of communication). The terminal device identification information can be generated/issued as unique identifiers by the communication device 10A when connection with the terminal devices 20 and 30 is established for the first time. Alternatively, the terminal device identification information can be embedded in advance in the terminal devices 20 and 30. Moreover, it is also possible to use identification information, such as MAC addresses, that is unique to the terminal devices 20 and 30 as the terminal device identification information.

A parameter "tcp_server_id" represents the TCP server device identification information that, as described above, is the identification information of the communication server of the first connection maintaining unit 14 which is decided to be the connection destination for the terminal devices 20 and 30. More particularly, the TCP server device identification information is a uniform resource locator (URL) of the connection destination. When a WebSocket server is used as the first connection maintaining unit 14, the TCP server device identification information is written as, for example, ws:// . . . or wss:// . . . .

A parameter "udp_server_id" represents the UDP server device identification information that, as described above, is the identification information of the communication server constituting the second connection maintaining unit 15. Herein, the UDP server device identification information can be a fully qualified domain name (FQDN) or can be a set of an IP address and a port number. Moreover, the UDP server device identification information can be configured to be paid out when the determining unit 16 performs determination or when it is already determined that the first terminal device 20 that issued a connection establishment request can maintain a communicable state according to the second method; or can be configured to be paid out on a constant basis.

A "conn_id" represents the connection identification information (a parameter "dst_conn_id" represents the connection identification information of the terminal device at the other end of communication). The connection identification information can be configured to be unique across a plurality of communication servers (WebSocket servers) of the first connection maintaining unit 14, or can be configured to be unique for each communication server. Moreover, the connection identification information can be configured to be paid out as a response to a connection establishment request, or can be configured to be paid out at the time of issuing an instruction to switch the communication maintenance method from the second method to the first method. Furthermore, the connection identification information can be configured to be paid out during a sequence of establishing WebSocket connection with the first connection maintaining unit 14.

A parameter "tcp_or_udp" represents the communication maintenance method that, as described above, represents information indicating the existing communication maintenance method implemented in the first terminal device 20. Thus, the parameter is set to "tcp" to represent the first method, and is set to "udp" to represent the second method. Thus, every time the communication maintenance method of the first terminal device 20 is switched, the parameter is updated.

The sequence diagram illustrated in FIG. 7 represents a flow of operations starting from the operation in which the first terminal device 20 issues a connection establishment request to the communication device 10A up to the operation in which the first terminal device 20 performs WebSocket communication with the second terminal device 30. Meanwhile, prior to the operations according to the sequence diagram illustrated in FIG. 7, the first terminal device 20 issues an authentication request to the communication device 10A, and receives a notification of successful authentication as the authentication result.

Firstly, when the first terminal device 20 issues a connection establishment request to the communication device 10A (Step S101), the connection destination deciding unit 13 decides on one of the communication servers (WebSocket servers) of the first connection maintaining unit 14 as the connection destination of the first terminal device 20 that issued the connection establishment request, and registers the connection management information in the connection management information memory 19 (Step S102). Moreover, the connection destination deciding unit 13 notifies the first terminal device 20, which issued the connection establishment request, about the connection destination information that contains the TCP server device identification information, the UDP server device identification information, the connection identification information, and the session identification information (Step S103).

Subsequently, when the first terminal device 20 issues a determination request to the communication device 10A (Step S104), the determining unit 16 responds to the determination request and determines whether or not the first terminal device 20, which issued the determination request, can maintain a communicable state with the communication device 10A according to the second method (Step S105). Then, according to the result of determination, the determining unit 16 updates the connection management information stored in the connection management information memory 19 (Step S106). Meanwhile, a specific example of the determination is explained later. At Step S104, in order for a server device to ensure the message integrity of the determination request (to ensure that the message is not tampered), a message authentication code can be added in which the session identification information is treated as shared key information. More particularly, a hash-based message authentication code (HMAC) is generated with the message at Step S104 and the session identification information serving as the key, and the HMAC is added to the message. On the other hand, a server device obtains, based on the identification information of a terminal specified an the message (the terminal device identification information or the connection identification information), the session identification information from the connection management information memory and generates an HMAC from the received message with the obtained identification information serving as the key. Then, if the HMAC specified in the message coincides with the generated HMAC, it is confirmed that the determination request is received from a valid terminal that has been authenticated. However, if the HMACs do not coincide, then the server device either destroys the message or sends back an error. This sequence of operations can be performed on a constant basis during the UDP communication performed at Step S107.

The subsequent operations differ according to the result of determination obtained at Step S105. Firstly, the explanation is given for the operations performed when it is determined that the first terminal device 20 can maintain a communicable state with the communication device 10A according to the second method. In this case, the first terminal device 20 receives a notification of "determination result: maintainable" from the communication device 10A. Upon receiving a notification of "determination result: maintainable" from the determining unit 16, the first terminal device 20 maintains a communicable state with the communication device 10A according to the second method (the UDP heartbeat) (Step S107). As a result, the communication device 10A is maintained in a state enabling a UDP access from the second connection maintaining unit 15 to the first terminal device 20.

Subsequently, when the second terminal device 30, which has a correspondence relationship with the first terminal device 20, issues a connection establishment request to the communication device 10A (Step S108), the connection destination deciding unit 13 decides on the same communication server (the same WebSocket server), which is the connection destination for the first terminal device 20, as the connection destination for the second terminal device 30 too. Moreover, the switch instructing unit 17A instructs the first terminal device 20, via the second connection maintaining unit 15, to switch the communication maintenance method from the second method (the UDP heartbeat) to the first method (the WebSocket connection). More particularly, the switch instructing unit 17A issues a switching instruction to the second connection maintaining unit 15 (Step S109). According to the switch instruction, the second connection maintaining unit 15 updates the connection management information stored in the connection management information memory 19 (Step S110) and notifies the first terminal device 20 about the switch instruction, which is received from the switch instructing unit 17A, in the form of a message (Step S111). To the second terminal device 30 that issued the connection establishment request, the connection: destination deciding unit 13 sends the connection destination information that contains the TCP server device identification information and the connection identification information (Step S112).

Upon receiving the switching instruction from the communication device 10A, the first terminal device 20 follows the switching instruction, accesses the communication server (the WebSocket server) of the first connection maintaining unit 14 that is notified as the connection destination, and establishes a connection (a WebSocket connection) with the communication device 10A (Step S113). When the connection with the first terminal device 20 is established, the first connection maintaining unit 14 updates the connection management information stored in the connection management information memory 19 (Step S114).

Meanwhile, if it is determined that the first terminal device 20 cannot maintain a communicable state with the communication device 10A according to the second method, the first terminal device 20 receives a notification of "determination result: non-maintainable" from the communication device 10A. In that case, the first terminal device 20 accesses the communication server (the WebSocket server) of the first connection maintaining unit 14 that is notified as the connection destination and establishes a connection (a WebSocket connection) with the communication device 10A (Step S115). When the connection with the first terminal device 20 is established, the first connection maintaining unit 14 updates the connection management information stored in the connection management information memory 19 (Step S116).

Subsequently, when the second terminal device 30, which has a correspondence relationship with the first terminal device 20, issues a connection establishment request to the communication device 10A (Step S117), the connection destination deciding unit 13 decides on the same communication server (the same WebSocket server), which is the connection destination for the first terminal device 20, as the connection destination for the second terminal device 30 too; and notifies the second terminal device 30 about the connection destination information that contains the TCP server device identification information and the connection identification information (Step S118).

Then, the second terminal device 30 accesses the communication server (the WebSocket server) of the first connection maintaining unit 14 that is notified as the connection destination and establishes a connection (a WebSocket connection) with the communication device 10A (Step S119). Thereafter, the first terminal device 20 and the second terminal device 30 perform WebSocket communication via the same WebSocket server of the first connection maintaining unit 14 (Step S120).

Figure 8:
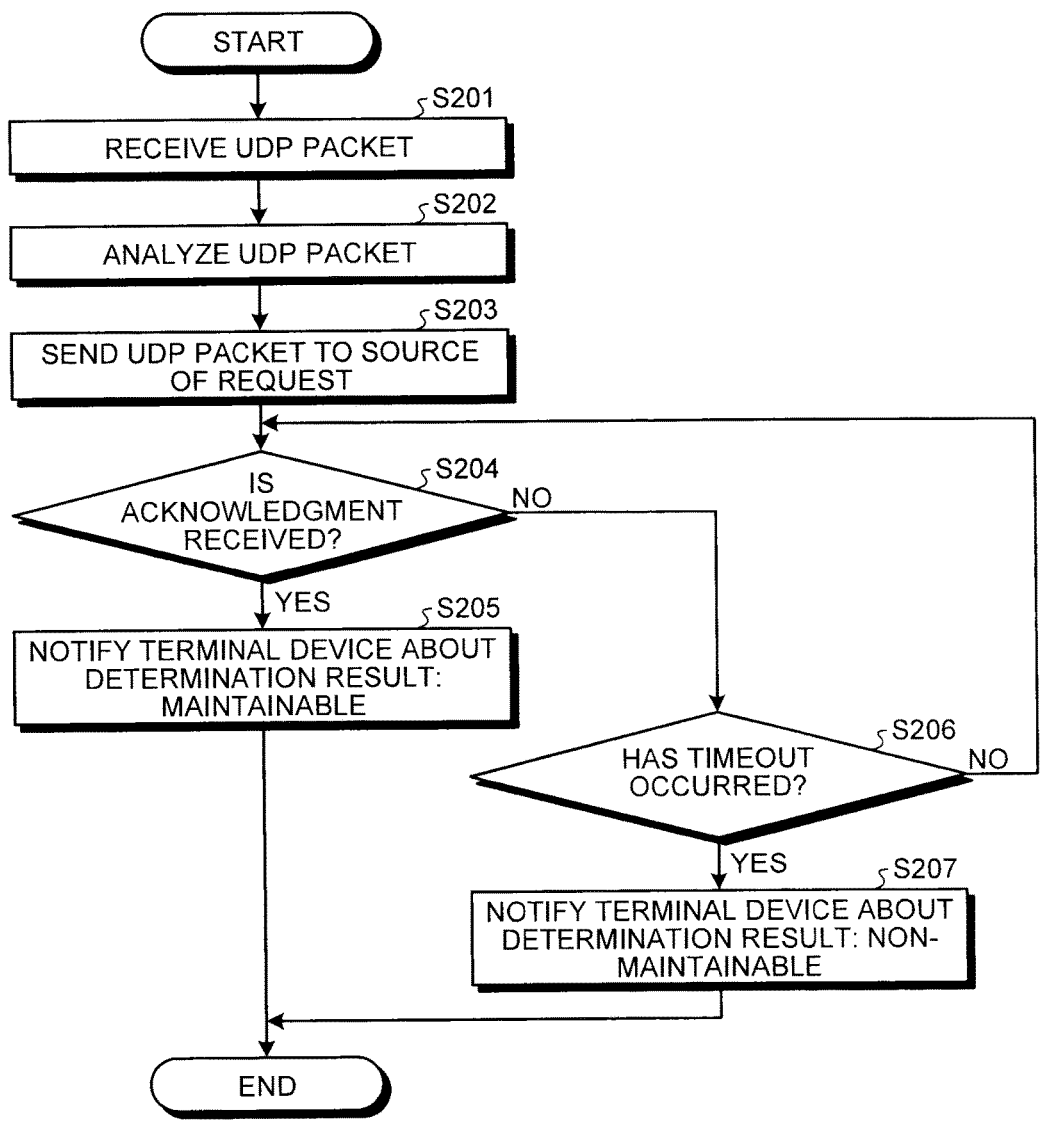
FIG. 8 is a flowchart for explaining the sequence of operations during a determination performed by a determining unit.

Explained below with reference to FIG. 8 is a specific example of the determination performed at Step S104 illustrated in FIG. 7. FIG. 8 is a flowchart for explaining the sequence of operations during the determination performed by the determining unit 16. The determination performed by the determining unit 16 is performed in response to a determination request received from the first terminal device 20. Herein, the first terminal device 20 sends the determination request using, for example, a UDP packet.

Upon receiving the UDP packet from the first terminal device 20 (Step S201), the determining unit 16 analyzes the received UDP packet and obtains the IP address/port number of the source of request (Step S202). Then, the determining unit 16 sends the UDP packet to the IP address/port number obtained at Step S202 (Step S203).

Subsequently, the determining unit 16 determines whether or not an acknowledgment is received against the UDP packet sent at Step S203 (Step S204). If an acknowledgment is received (Yes at Step S204), then the determining unit 16 determines that the first terminal device 20 can maintain a communicable state with the communication device 10A according to the second method, and sends "determination result: maintainable" to the first terminal device 20 (Step S205).

However, if there occurs a timeout without receiving an acknowledgement (No at Step S204, Yes at Step S206), then the determining unit 16 determines that the first terminal device 20 cannot maintain a communicable state with the communication device 10A according to the second method, and sends "determination result: non-maintainable" to the first terminal device 20 (Step S207). Meanwhile, until a timeout occurs (No at Step S206), the determination at Step S204 is performed in a repeated manner.

Figure 9:
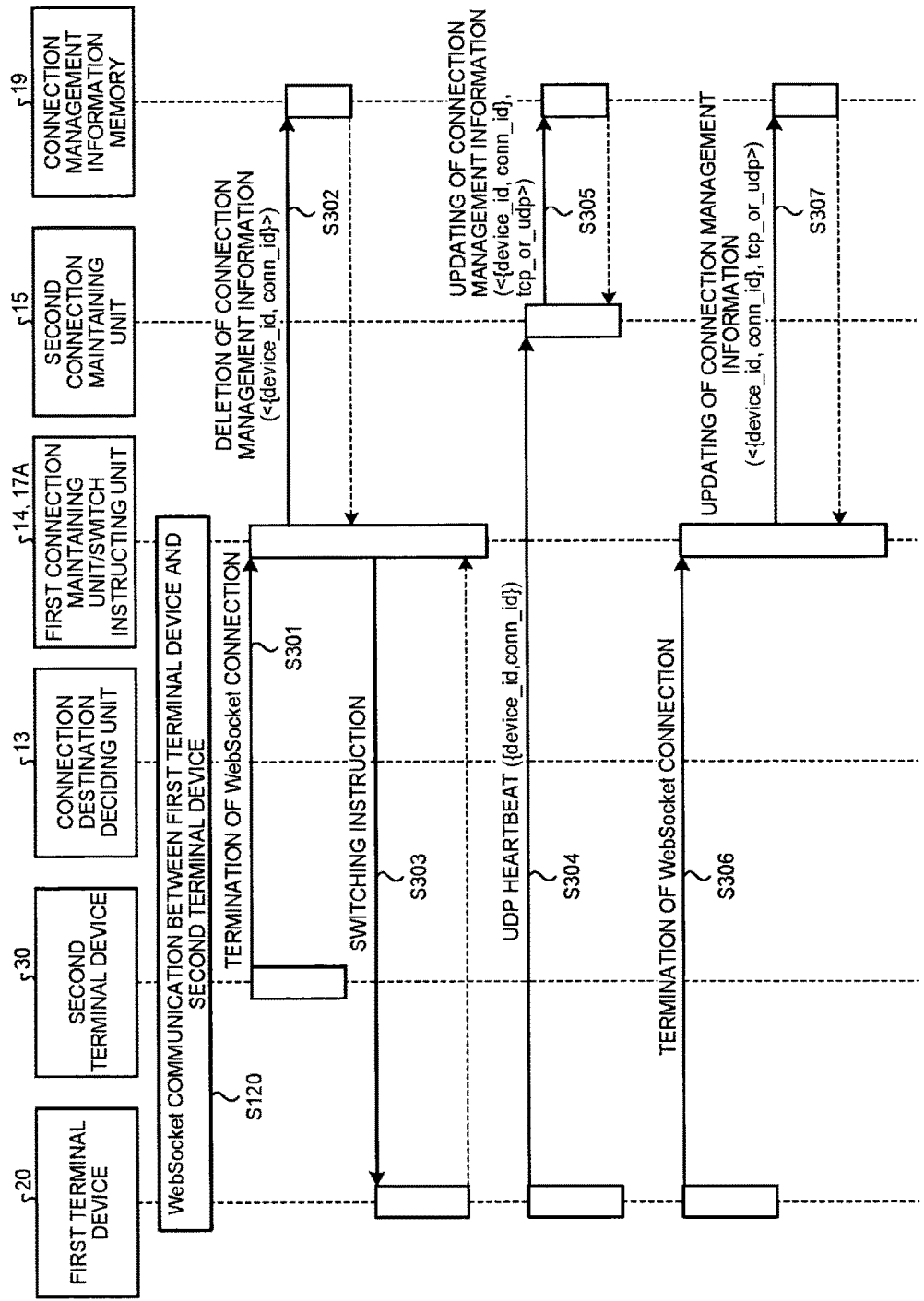
FIG. 9 is a sequence diagram illustrating the operations performed by the communication device according to the first embodiment.

Given below is the explanation of the operations performed when by the second terminal device 30, which has performed WebSocket communication with the first terminal device 20, terminates the connection with the communication device 10A. FIG. 9 is a sequence diagram illustrating the operations performed by the communication device 10A when the second terminal device 30 terminates the connection.

Firstly, when the second terminal device 30 terminates the WebSocket connection with the first connection maintaining unit 14 (Step S301), the first connection maintaining unit 14 deletes the connection management information regarding the second terminal device 30 from the connection management information memory 19 (Step S302). Then, the switch instructing unit 17A instructs the first terminal device 20 to switch the communication maintenance method from the first method (the WebSocket connection) to the second method (the UDP heartbeat) (Step S303). This switching instruction is notified to the first terminal device 20 via the first connection maintaining unit 14.

Upon receiving the switching instruction from the communication device 10A, the first terminal device 20 follows the switching instruction and firstly starts the UDP heartbeat (the second method) with respect to the second connection maintaining unit 15 (Step S304). Once the UDP heartbeat is started by the first terminal device 20, the second connection maintaining unit 15 updates the connection management information stored in the connection management information memory 19 (Step S305).

Then, the first terminal device 20 terminates the WebSocket connection with the first connection maintaining unit 14 (Step S306). Once the WebSocket connection with the first terminal device 20 is terminated, the first connection maintaining unit 14 updates the connection management information stored in the connection management information memory 19 (Step S307).

As described above in detail with reference to a specific example, in the first embodiment, regarding the first terminal device 20 that is the terminal to be operated which issued a connection establishment request in the first instance, the communication device 10A makes the first terminal device 20 maintain a communicable state with the communication device 10A according to the second method. Subsequently, when the second terminal device 30 that is the operating terminal issues a connection establishment request, the communication device 10A instructs the first terminal device 20 to switch the communication maintenance method from the second method to the first method. Moreover, when termination of the connection with the second terminal device 30 is detected, the communication device 10A instructs the first terminal device 20, which is maintaining a communicable state with the communication device 10A according to the first method, to switch the communication maintenance method from the first method to the second method. That is, in the first embodiment, the communication device 10A is configured in such a way that, only during the period of time in which the second terminal device 30 that is the operating terminal is connected, the first connection maintaining unit 14 maintains a connection with the first terminal device 20 that is the terminal to be operated. As a result, in the communication device 10A according to the first embodiment, while holding down an increase in the number of connections to be maintained by the first connection maintaining unit 14 and while holding down an increase in the memory usage in an effective manner, it becomes possible to achieve low-delay communication between the first terminal device 20 and the second terminal device 30 via the first connection maintaining unit 14.

Furthermore, in the first embodiment, the communication device 10A determines whether or not the first terminal device 20, which requests for the establishment of a connection, can maintain a communicable state with the communication device 10A according to the second method. Only when the first terminal device 20 that can maintain a communicable state according to the second method, the communication device 10A issues a switching instruction described above. Therefore, the communication device 10A according to the first embodiment can be effectively implemented in various network environments. Meanwhile, if the communication device 10A is implemented in a network environment in which it is guaranteed that the first terminal device 20 can maintain a communicable state with the communication device 10A according to the second method, then the configuration can be such that the abovementioned determination is skipped.

First Modification Example

In the example described above, the configuration is such that, after issuing a connection establishment request to the communication device 10A, the first terminal device 20 waits for the result of determination performed by the determining unit 16; and, upon receiving a notification of the result of determination, maintains a communicable state with the communication device 10A according to either the first method or the second method depending on the result of determination. Alternatively, the configuration can be such that, until the determining unit 16 completes the determination, the first terminal device 20 maintains a communicable state according to the first method; and, when a notification of "determination result: maintainable" is received, the switch instructing unit 17A instructs the first terminal device 20 to switch the communication maintenance method from the first method to the second method. As a result, while the determining unit 16 is performing the determination, even if the second terminal device 30 that is the operating terminal accesses the first terminal device 20 via the first connection maintaining unit 14, the first terminal device 20 becomes able to receive the access.

Second Modification Example

In the example described above, the configuration is such that the determining unit 16 performs a determination after the first terminal device 20 issues a connection establishment request to the communication device 10A. That is, every time the first terminal device 20 issues a connection establishment request, the determining unit 16 performs the determination. Alternatively, the configuration can be such that, regarding the first terminal device 20 for which the determination is already performed, the result of determination is stored in a corresponding manner to the terminal device identification information. Then, when that first terminal device 20 again issues a connection establishment request after the connection has been terminated by the first connection maintaining unit 14, stored result of determination is reused thereby avoiding repetition of the determination. As a result, whether or no the first terminal device 20 can maintain a communicable state with the communication device 10A according to the second method can be determined in an effective manner. Meanwhile, a memory for storing information in a corresponding manner to the terminal device identification information, such as a terminal information memory (see FIG. 11) (described later), can be added for the purpose of storing the result of determination.

Still alternatively, the configuration can be such that, when a connection establishment request is issued by the first terminal device 20 for which the corresponding result of determination is stored, the determining unit 16 determines whether or not a predetermined redetermination condition is satisfied. Only if the redetermination condition is satisfied, then the determining unit 16 again performs the determination without reusing the result of determination. Herein, examples of the redetermination condition include a case in which there is no response to a switching instruction issued via the second connection maintaining unit 15 (i.e., when a communication failure is detected by the second connection maintaining unit 15), a case in which a predetermined period of time is elapsed since the previous determination, a case in which the number of times of reusing the determination result exceeds a predetermined count, and a case in which a change is detected in the external IP address/port number of the first terminal device 20.

Third Modification Example

In the example described above, the configuration is such that, in order to set the communication maintenance method of the first terminal device 20 to the first method only when necessary, when the second terminal device 30 issues a connection establishment request, the first terminal device 20 is instructed to switch the communication maintenance method from the second method to the first method; and, when termination of the connection with the second terminal device 30 is detected, the first terminal device 20 is instructed to switch the communication maintenance method from the first method to the second method. However, alternatively, the configuration can be as follows. That is, a period of time having a high frequency of use of the first terminal device 20 is set in advance. When the current time is the start time of that period of time, then the first terminal device 20 is instructed to switch the communication maintenance method from the second method to the first method. Moreover, when the current time is the end time of that period of time, then the first terminal device 20 is instructed to switch the communication maintenance method from the first method to the second method.

In this case, the configuration can also be such that a period of time having a high frequency of use is set in advance for each first terminal device 20, and the information about that period of time is stored in a corresponding manner to the terminal device identification information of the first terminal device 20. Particularly, when the communication device 10A performs communication with a number of first terminal devices 20 installed in various regions having time differences therebetween, if a period of time having a high frequency of use is set in advance for each first terminal device 20 or for each region, then switching of the communication maintenance method can be done in an effective manner.

Fourth Modification Example

In the example described above, a terminal device is configured in such a way that, once the terminal device issues a connection establishment request, it maintains the connection with a server device as long as the connection is maintainable using the UDP heartbeat. Alternatively, it is also possible to think of a configuration in which some type of timeout is set so that the terminal device periodically starts the operations from issuing a connection establishment request. For example, it is desirable from the security perspective that a session identifier required in HMAC generation is periodically refreshed. Herein, the configuration can be such that a server device detects the timeout of the session identifier and sends a trigger to the concerned terminal device to again start the operations from issuing a connection establishment request.

Second Embodiment

Given below is the explanation of a second embodiment. In the second embodiment, the switching condition for the first terminal device 20 to switch the communication maintenance method is different from the first embodiment. In the first embodiment, establishing a connection and terminating the connection of the second terminal device 30 are set as the switching conditions. In contrast, in the second embodiment, a high degree of the load state of a communication device (the load state of the first connection maintaining unit 14) is set as the switching condition. In the following explanation, the constituent elements identical to the first embodiment are referred to by the same reference numerals, and the concerned explanation is not repeated. Moreover, the following explanation is given only about the distinguishing points of the second embodiment.

Figure 10:
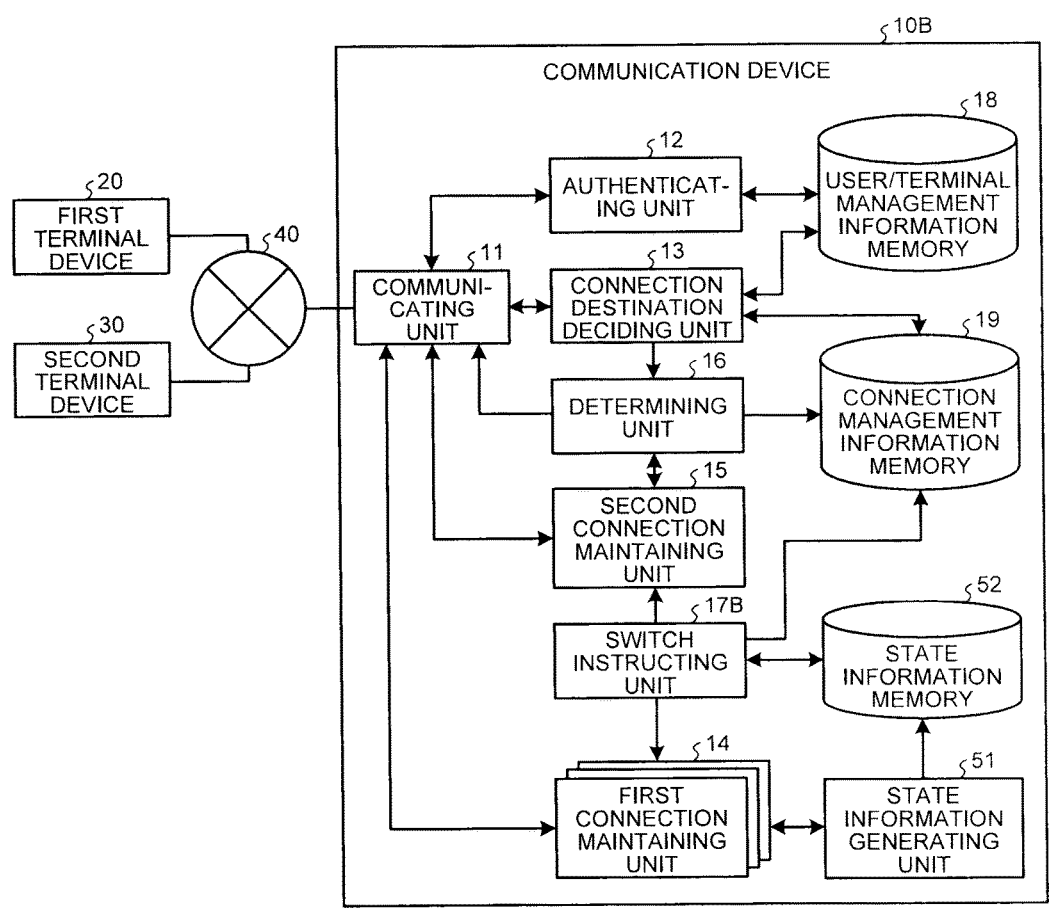
FIG. 10 is a configuration diagram of a communication device according to a second embodiment.

FIG. 10 is a configuration diagram of a communication device 10B according to the second embodiment. As illustrated in FIG. 10, the communication device 10B according to the second embodiment includes, in addition to the configuration of the communication device 10A according to the first embodiment, a state information generating unit 51 and a state information memory 52. Moreover, the communication device 10B according to the second embodiment includes a switch instructing unit 17B in place of the switch instructing unit 17A according to the first embodiment.

The state information generating unit 51 generates state information that indicates the load state of the first connection maintaining unit 14. The state information indicates, for example, either the number of terminal devices 20 and 30 maintaining the connection with the first connection maintaining unit 14 (i.e., the connection capacity), or the memory usage, or the processor utilization, or a combination of those values. Regarding the connection capacity and the memory usage, such capacity information can be held in advance and, as is the case of the CPU utilization, relative values obtained by comparing with the capacity information can be used. The state information is generated, for example, in a periodic manner in predetermined cycles. Alternatively, the state information can be generated when a change in the load state is detected.

The state information memory 52 stores therein the state information generated by the state information generating unit 51. That is, every time the state information generating unit 51 generates new state information, the state information stored in the state information memory 52 is updated.

The switch instructing unit 17B refers to, on an as-needed basis, the state information stored in the state information memory 52; and compares the state information (the connection capacity, or the memory usage, or the processor utilization, or a combination of those values) with a predetermined threshold value. When the state information exceeds the predetermined threshold value, the first terminal device 20 that is maintaining a communicable state with the communication device 10B according to the first method is instructed to change the communication maintenance method from the first method to the second method. Thus, in the second embodiment, while the load is low, the communication device 10B allows the first terminal device 20 to maintain communication according to the first method. However, when the load increases, the communication device 10B instructs the first terminal device 20 to switch to the second method.

For example, of the first terminal devices 20 that are maintaining a communicable state with the communication device 10B, the instruction for switching the communication maintenance method can be issued in a sequential manner according to an arbitrarily-set standard. For example, it is possible to think of a method in which, until the state information indicating the load state becomes equal to or smaller than a threshold value, the switching instruction is issued in a sequential manner starting from the first terminal device 20 that issued a connection establishment request at the latest timing; or a method in which the switching instruction is issued in a sequential manner starting from the first terminal device 20 that issued a connection establishment request at the earliest timing.

As described above, according to the second embodiment, the communication device 10B allows the first terminal device 20 to maintain communication according to the first method while the load is low, but instructs the first terminal device 20 to switch to the second method when the load increases. Therefore, in the communication device 10B according to the second embodiment, in addition to the effect achieved in the first embodiment, it is also possible to achieve an effect of effectively holding down an increase in the delay and the processing load attributed to frequent switching of the communication maintenance method of the first terminal device 20.

Third Embodiment

Given below is the explanation of a third embodiment. In the third embodiment, when a predetermined switching condition is satisfied, the first terminal device 20 that is maintaining a communicable state according to the first method and that satisfies a predetermined switching target condition is instructed to switch the communication maintenance method from the first method to the second method. In the following explanation, the constituent elements identical to the first embodiment are referred to by the same reference numerals, and the concerned explanation is not repeated. Moreover, the following explanation is given only about the distinguishing points of the third embodiment.

Figure 11:
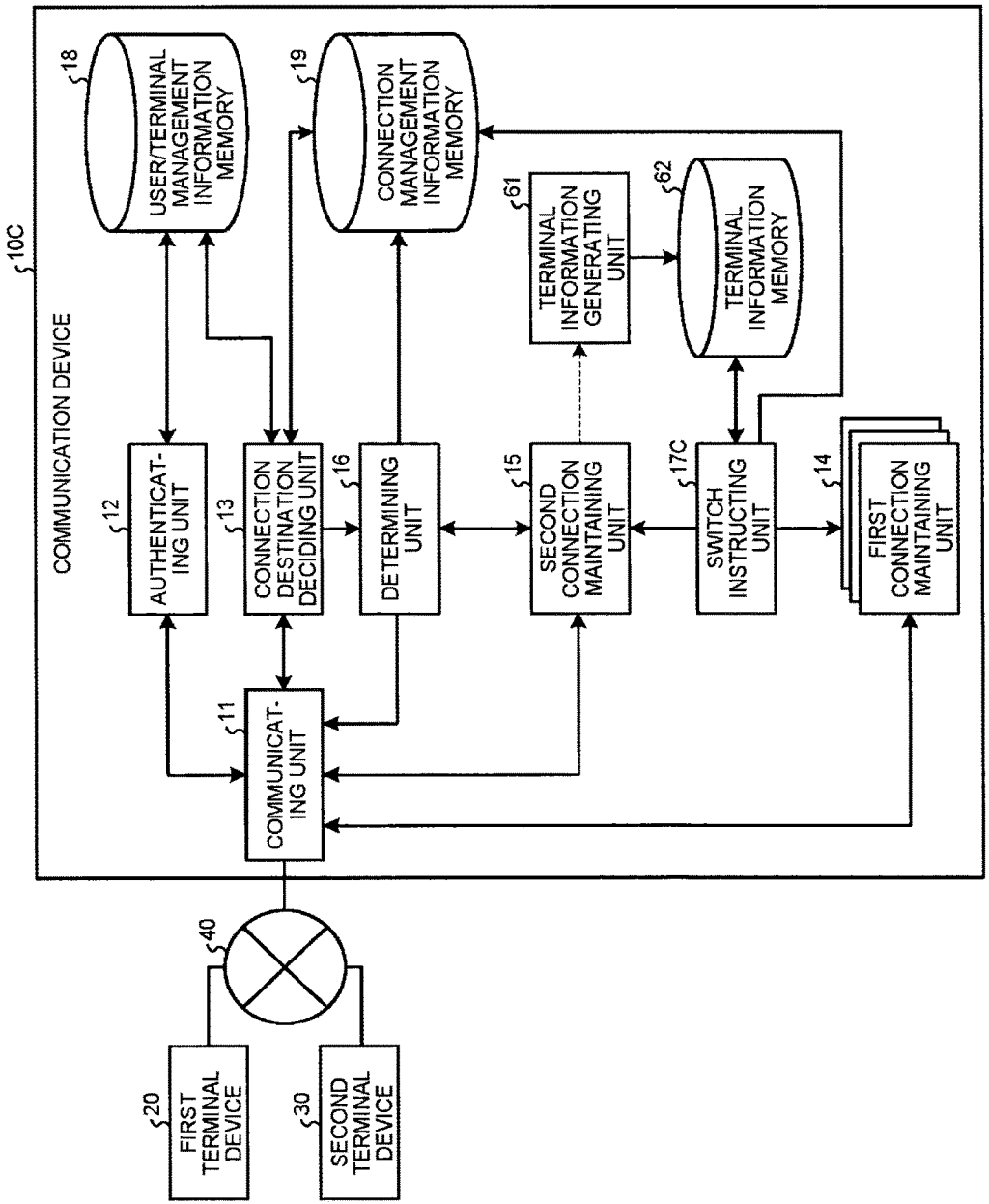
FIG. 11 is a configuration diagram of a communication device according to a third embodiment.

FIG. 11 is a configuration diagram of a communication device 100 according to the third embodiment. As illustrated in FIG. 11, the communication device 10C according to the third embodiment includes, in addition to the configuration of the communication device 10A according to the first embodiment, a terminal information generating unit 61 and a terminal information memory 62. Moreover, the communication device 100 according to the third embodiment includes a switch instructing unit 17C in place of the switch instructing unit 17A according to the first embodiment.

The terminal information generating unit 61 generates a variety of information related to the first terminal device 20. For example, the terminal information generating unit 61 generates terminal information by obtaining the information included in the communication made by the first terminal device 20 to the communication device 100 (information similar to device information set in the communication protocol, such as User-Agent information included in the HTTP header) and the information related to the first terminal device 20 and explicitly registered by the user of the first terminal device 20. The terminal information represents model information of the first terminal device 20, and the access history of past accesses made from the second terminal device 30 to the first terminal device 20. The access history includes statistical information such as the presence or absence of accesses made from the second terminal device 30 to the first terminal device 20, the access count, the access frequency, the last accessing time, and the accessing period.

The terminal information memory 62 stores therein the terminal information, which is generated by the terminal information generating unit 61, in a corresponding manner to the terminal device identification information of the first terminal device 20.

When a predetermined switching condition is satisfied, the switch instructing unit 17C instructs the first terminal device 20 that is maintaining a communicable state according to the first method and that satisfies a predetermined switching target condition to switch the communication maintenance method from the first method to the second method. Herein, whether or not the first terminal device 20 satisfies the predetermined switching target condition is determined based on the terminal information stored in the terminal information memory 62.

For example, the switch instructing unit 17C identifies the model of the first terminal device 20 based on the model information included in the terminal information. Then, if the first terminal device 20 is a device having a low information processing capacity, such as a large household electrical appliance; then the first terminal device 20 is determined to not satisfy the switching target condition. On the other hand, if the first terminal device 20 is a device having a high information processing capacity, such as a PC, a tablet terminal, or a digital television set; the first terminal device 20 is determined to satisfy the switching condition. That is, when a predetermined switching condition is satisfied, only if the first terminal device 20 that is maintaining a communicable state according to the first method is a device having a high information processing capacity, the switch instructing unit 17C instructs the first terminal device 20 to switch the communication maintenance method from the first method to the second method.

Moreover, based on the access history included in the terminal information, if the first terminal device 20 has been previously accessed from the second terminal device 30 even just once, then the switch instructing unit 17C can determine that the switching target condition is not satisfied. On the other hand, if the first terminal device 20 has not been previously accessed even once from the second terminal device 30, then the switch instructing unit 170 can determine that the switching target condition is satisfied. That is, when a predetermined switching condition is satisfied, only if the first terminal device 20 that is maintaining a communicable state according to the first method has not been previously accessed even once from the second terminal device 30, the switch instructing unit 17C can instruct the first terminal device 20 to switch the communication maintenance method from the first method to the second method.

Furthermore, based on the access history included in the terminal information, if the first terminal device 20 has been previously accessed with high frequency from the second terminal device 30, then the switch instructing unit 17C can determine that the switching target condition is not satisfied. On the other hand, if the first terminal device 20 has been previously accessed with low frequency from the second terminal device 30, then the switch instructing unit 17C can determine that the switching target condition is satisfied. That is, when a predetermined switching condition is satisfied, only if the first terminal device 20 that is maintaining a communicable state according to the first method has not been previously accessed with high frequency from the second terminal device 30, the switch instructing unit 17C can instruct the first terminal device 20 to switch the communication maintenance method from the first method to the second method.

Moreover, based on the access history included in the terminal information, if the elapsed time since the first terminal device 20 was previously accessed from the second terminal device 30 is equal to or smaller than a predetermined period of time, then the switch instructing unit 17C can determine that the switching target condition is not satisfied. On the other hand, when the elapsed time since the first terminal device 20 was previously accessed from the second terminal device 30 exceeds the predetermined period of time, then the switch instructing unit 17C can determine that the switching target condition is satisfied. That is, when a predetermined switching condition is satisfied, only if the elapsed time since the first terminal device 20 that is maintaining a communicable state according to the first method was previously accessed from the second terminal device 30 exceeds the predetermined period of time, the switch instructing unit 17C can instruct the first terminal device 20 to switch the communication maintenance method from the first method to the second method.

As described above, according to the third embodiment, depending on the model of the first terminal device 20 and the access history of past accesses made from the second terminal device 30, the communication device 10C instructs the first terminal device 20, which is assumed to be only lightly affected by switching the communication maintenance method to the second method, to switch the communication maintenance method from the first method to the second method. Therefore, in the communication device 10C according to the third embodiment, in addition to the effect achieved in the first embodiment, it is also possible to achieve, for example, an effect of holding down the inconvenience in the form of a delay occurring due to switching of the communication maintenance method by a device having a low information processing capacity. Moreover, since the first terminal device 20 that is likely to be accessed from the second terminal device 30 is maintained to have the first method as the communication maintenance method, it becomes possible to reduce the delay at the time of switching the communication maintenance method.

Supplementary Explanation

The functional constituent elements of each of the communication devices 10A, 10B, and 10C can be implemented using computer programs (software) executed with the basic hardware of, for example, a commonly-used computer system.

Figure 12:
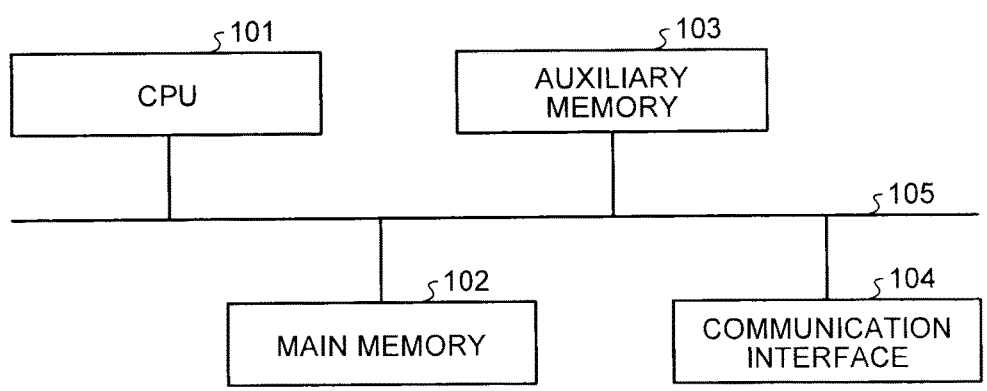
FIG. 12 is a diagram illustrating an exemplary hardware configuration of the communication device.

FIG. 12 is a diagram illustrating an exemplary hardware configuration of the communication devices 10A, 10B, and 10C. As illustrated in FIG. 12, each of the communication devices 10A, 10B, and 10C is configured as a commonly-used computer system that includes a CPU 101, a main memory 102, an auxiliary memory 103, a communication interface 104, and a bus 105 that interconnects the other constituent elements. Moreover, the auxiliary memory 103 can also be connected to the other constituent elements by a local area network (LAN) of the wired type or the wireless type.

For example, when the CPU 101 executes the computer programs, which are stored in the auxiliary memory 103, using the main memory 102, the functional constituent elements of the communication devices 10A, 10B, and 10C are implemented. The computer programs are recorded in, for example, a magnetic disk (such as a flexible disk or a hard disk), an optical disk (a CD-ROM, a CD-R, a DVD-ROM, a DVD±R, a DVD+RW, or a Blu-ray (registered trademark) disk), a semiconductor memory, or a recording medium of a similar type. As long as the recording medium in which the computer programs are stored is readable by a computer system, the recording format is no object.

Alternatively, the computer programs can be installed in advance in the computer system, or can be distributed via a network and installed in the computer system. Still alternatively, the computer programs can be executed in an external server computer, and the execution result can be received by the communication devices 10A, 10B, and 10C configured as client computers.

The computer programs executed in the computer system contain modules of the functional constituent elements of the communication devices 10A, 10B, and 10C. When the CPU 101 reads the computer programs and executes them, the computer programs are loaded in the main memory 102 and the functional constituent elements of the communication devices 10A, 10B, and 10C are generated in the main memory 102.

Meanwhile, aside from implementing the functional constituent elements of the communication devices 10A, 10B, and 10C using computer programs (software), some or all of the functional constituent elements can be implemented using dedicated hardware such as an application specific integrated circuit (ASIC) or a field-programmable gate array (FPGA).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device comprising:
   a plurality of first communication servers and a second communication server, each first communication server enabling a terminal device to maintain a communicable state with the communication device by maintaining a connection with the each first communication server, the second communication server enabling the terminal device to maintain a communicable state with the communication device by periodically accessing to the second communication server;
   processing circuitry coupled to a memory, wherein the processing circuitry is configured to:
   when a request for establishing the connection is issued by a first terminal device, determine a first communication server among the plurality of the first communication servers as a connection destination of the first terminal device;
   register connection management information about the first terminal device in storage, the connection management information including identification information of the first communication server determined as the connection destination of the first terminal device;
   determine whether or not the first terminal device is capable of maintaining the communicable state with the communication device by periodically accessing to the second communication server, wherein the storage stores therein a determination result of whether or not the first terminal device is capable of maintaining the communicable state with the communication device by periodically accessing to the second communication server, by associating the determination result with identification information of the first terminal device;
   when the first terminal device is determined to be capable of maintaining the communicable state with the communication device by periodically accessing to the second communication server, instruct the first terminal device to maintain the communicable state with the communication device by periodically accessing to the second communication server;
   when a request for establishing the connection is issued by the second terminal device which has a predetermined correspondence relationship with the first terminal device, determine, as a connection destination of the second terminal device, the first communication server determined as the connection destination of the first device by referring to the connection management information;
   instruct the first terminal device, which maintains the communicable state with the communication device by periodically accessing to the second communication server, to connect to the first communication server determined as the connection destination wherein the connection protocol used to connect to the first communication server is different from the connection protocol used to periodically access the second communication server; and
   instruct the second terminal device to connect to the first communication server determined as the connection destination, wherein
   the first communication server connected to the first terminal device and the second terminal device mediates a communication between the first terminal device and the second terminal device using connection information of the first terminal device and the second terminal device that are cached in the memory.

2. The device according to claim 1, wherein the processing circuitry is configured to, when a current time becomes a start time of a predetermined period of time during which a frequency of use of the first terminal device is high, instruct the first terminal device, which is maintaining the communicable state with the communication device by periodically accessing to the second communication server to connect to the first communication server determined as the connection destination.

3. The device according to claim 2, wherein the processing circuitry is configured to, when a current time becomes an end time of the period of time, instruct the first terminal device, which is maintaining the communicable state with the communication device by maintaining the connection with the first communication server, to maintain the communicable state with the communication device by periodically accessing to the second communication server.

4. The device according to claim 1, wherein the processing circuitry is configured to, when a load state of the communication device exceeds a predetermined threshold value, instruct the first terminal device, which is maintaining the communicable state with the communication device by maintaining the connection with the first communication server, to maintain the communicable state with the communication device by periodically accessing to the second communication server.

5. The device according to claim 4, wherein the load state represents either number of terminal devices maintaining a connection with the first communication servers, or memory usage, or processor utilization, or a combination thereof.

6. The device according to claim 1, wherein the processing circuitry is configured to instruct the first terminal device, which is maintaining the communicable state with the communication device by maintaining the connection with the first communication server and which satisfies a predetermined switching target condition, to maintain the communicable state with the communication device by periodically accessing to the second communication server.

7. The device according to claim 6, wherein the switching target condition is a condition set based on at least one of model of the first terminal device and access history of accesses to the first terminal device from the second terminal device which communicates with the first terminal device via the first communication server.

8. The device according to claim 1, wherein
the processing circuitry is configured to, when the determination result for the first terminal device that issued a request for establishing a connection is stored in the memory, reuse the determination result to determine whether or not the first terminal device is capable of maintaining the communicable state with the communication device by periodically accessing to the second communication server.

9. The device according to claim 8, wherein the processing circuitry is configured to, even when the determination result for the first terminal device that issued a request for establishing a connection is stored in the memory, if a predetermined redetermination condition is satisfied, not reuse the determination result and redetermine whether or not the first terminal device is capable of maintaining the communicable state with the communication device by periodically accessing to the second communication server.

10. The device according to claim 1, wherein the processing circuitry is configured to, when termination of connection between the second terminal device and the communication device is detected, instruct the first terminal device, which is maintaining the communicable state with the communication device by maintaining the connection with the first communication server, to maintain the communicable state with the communication device by periodically accessing to the second communication server.

11. The device according to claim 1, wherein the first terminal device maintains the communicable state with the communication device by maintaining the connection with the first communication server until determination of whether or not the first terminal device is capable of maintaining the communicable state with the communication device by periodically accessing to the second communication server ends.

12. The device according to claim 1, wherein communication server is a Web Socket server, and the second communication server is a UDP hole punching server.

13. A terminal device that performs communication with the communication device according to claim 1 via a network, the terminal device comprising:
processing circuitry coupled to a memory, wherein the processing circuitry is configured to:
request the communication device to establish a connection with a first communication server:
maintain, according to an instruction from the communication device, a communicable state with the communication device by periodically accessing to a second communication server: and
connect, according to an instruction from the communication device, to the first communication server determined as the connection destination.

14. A computer program product comprising a non-transitory computer readable medium including programmed instructions, wherein the instructions, when executed by a computer that includes a plurality of first communication servers and a second communication server, each first communication serve enabling a terminal device to maintain a communicable state with the computer by maintaining a connection with the each first communication server, the second communication server enabling the terminal device to maintain a communicable state with the computer by periodically accessing to the second communication server, cause the computer to execute:
determining, when a request for establishing the connection is issued by a first terminal device, a first communication server among the plurality of the first communication servers as a connection destination of the first terminal device;
registering connection management information about the first terminal device in storage, the connection management information including identification information of the first communication server determined as the connection destination of the first terminal device;
determining whether or not the first terminal device is capable of maintaining the communicable state with the communication device by periodically accessing to the second communication server, wherein the storage stores therein a determination result of whether or not the first terminal device is capable of maintaining the communicable state with the communication device by periodically accessing to the second communication server, by associating the determination result with identification information of the first terminal device;
instructing, when the first terminal device is determined to be capable of maintaining the communicable state with the communication device by periodically accessing to the second communication server, the first terminal device to maintain the communicable state with the communication device by periodically accessing to the second communication server;
determining, when a request for establishing the connection is issued by the second terminal device which has a predetermined correspondence relationship with the first terminal device, the first communication server determined as the connection destination of the first device, as a connection destination of the second terminal device by referring to the connection management information;

instructing the first terminal device, which maintains the communicable state with the communication device by periodically accessing to the second communication server, to connect to the first communication server determined as the connection destination, wherein the connection protocol used to connect to the first communication server is different from the connection protocol used to periodically access the second communication server; and instructing the second terminal device to connect to the first communication server determined as the connection destination, wherein the first communication server connected to the first terminal device and the second terminal device mediates a communication between the first terminal device and the second terminal device using connection information of the first terminal device and the second terminal device that are cached in the memory.

\* \* \* \* \*